United States Patent [19]

Latorre

[11] Patent Number: 6,052,539
[45] Date of Patent: Apr. 18, 2000

[54] CAMERA THAT PRODUCES A SPECIAL EFFECT

[75] Inventor: Robert Latorre, Dallas, Tex.

[73] Assignee: Robert Latorre Productions, Inc., Dallas, Tex.

[21] Appl. No.: 09/314,037

[22] Filed: May 18, 1999

Related U.S. Application Data

[63] Continuation of application No. 08/968,617, Nov. 12, 1997, abandoned.

[51] Int. Cl.[7] .................................................. G03B 17/24
[52] U.S. Cl. ......................... 396/263; 396/301; 396/333; 352/85; 352/121
[58] Field of Search .................................. 396/324, 325, 396/330, 333, 301, 263; 352/85, 87, 100, 121, 122

[56] References Cited

U.S. PATENT DOCUMENTS

| 891,013 | 6/1908 | Smith . |
|---|---|---|
| 3,682,064 | 8/1972 | Matsunaga et al. . |
| 4,037,950 | 7/1977 | Lo et al. . |
| 5,022,727 | 6/1991 | Smith et al. . |
| 5,659,323 | 8/1997 | Taylor . |

OTHER PUBLICATIONS

Dayton Taylor, Virtual Camera Movement: The Way of the Future?, American Cinematograper, Sep. 1996, pp. 93–100, vol. 7 No. 9, Publisher ASC Holding Corp., Hollywood, CA 90028.

*Primary Examiner*—David M. Gray
*Attorney, Agent, or Firm*—Strasburger & Price, LLP

[57] ABSTRACT

A camera that produces a special photographic effect known as a "freeze" by simultaneously photographing an active subject from multiple perspectives. Multiple individual cameras are operated via a single computer controller and powered by a single external DC power supply. The photographs are then edited and sequenced to form a moving picture.

35 Claims, 3 Drawing Sheets

CAMERA THAT PRODUCES A SPECIAL EFFECT

This application is a continuation of U.S. patent application Ser. No. 08/968,617, filed Nov. 12, 1997 (12.11.1997) now abandoned, which is incorporated by reference into this disclosure.

TECHNICAL FIELD OF THE INVENTION

The present invention relates to a method of using multiple still cameras to fire simultaneously, producing multiple images from different perspectives of a subject at a discrete moment in time. These images are then edited by placing them in a sequential order to create a moving picture that depicts the subject at a particular moment from different perspectives.

BACKGROUND OF THE INVENTION

A "freeze" effect is defined for purposes of this application as a photographic effect where a moving subject is still-photographed from multiple perspectives simultaneously. The resulting images are then placed in a sequential order, based on angular or linear displacement, to form a moving picture, like a movie. Thus, the end product is a moving picture of an active subject frozen in time. A "freeze" creates the illusion of freezing in time an active subject while a movie camera photographs the subject from multiple perspectives.

To successfully create a "freeze," shutter timing is critical. The images must be made as close to simultaneously as possible. Because shutter speeds are measured in units as small as hundredths of a second, the slightest a synchronicity will destroy the effect: i.e., all the images will not be "frozen" at the same time, resulting in a moving picture where the subject appears to "jump" about.

To solve this problem, one existing method utilizes a single camera and a single piece of film. This camera has a single shutter controlling exposure through several lenses. The single shutter simultaneously exposes the film at different places through the different lenses, eliminating the need to synchronize multiple shutters. This single-shutter method, however, limits the camera's—and the viewers'—perspectives by limiting the possible linear displacement between the lenses and the displacement between the first and last lens. Further, a single shutter limits the lenses' arrangement to a line, or, using a camera constructed of a flexible material, a shallow arc. Finally, the single shutter limits the number of lenses through which the film may be exposed. This limits the number of images that the camera can create and, consequently, the length—in time—of the moving picture.

To create a longer "freeze" and a wider total linear and angular displacement, multiple shutters/cameras are necessary. However, using multiple shutters raises the problem of shutter asynchronicity and the resulting subject "jumpiness" in the moving picture product. A computer-enhancement technique known as "interlacing" minimizes this problem.

"Interlacing" works as follows: Suppose three cameras, A, B, and C, are arranged from left to right and fired simultaneously (or as close to simultaneously as possible) to create a "freeze." The computer "interlaces" the right half of camera A's image with the left half of camera B's image to form a new, "interlaced" image AB. Likewise, the right half of camera B's image is "interlaced" with the left half of camera C's image to form BC. In the resulting image sequence—A-AB-B-BC-C—shutter timing differences are minimized, or smoothed out. However, the resulting moving picture's quality is less than it would be if the shutters could be perfectly, or almost perfectly, synchronized.

This shutter synchronization must be virtually complete. Even if the shutters operate within hundredths of a second of one another, the resulting "freeze" will be ruined. For example, assume that the subject, or part of the subject, moves at fifty (50) feet per second. If the shutters each operate within one one-hundredth ($\frac{1}{100}$) of a second of one another, the images captured will still vary in space by as much as six (6) inches.

The photographer must solve a number of problems to synchronize more than one camera shutter. One problem to solve when synchronizing multiple cameras' shutters is firing all the cameras simultaneously. However, even if each camera begins the shutter operation process simultaneously, each shutter may not operate simultaneously. This is because of inherent timing tolerance differences within each camera's controlling circuitry, or central processing unit (CPU). Finally, an internal or external DC power supply typically powers a camera. Small variations in DC power supply voltage between two cameras can vary the speed with which the cameras' CPUs send a "fire" signal to their respective shutters. This power supply-dependent asynchronization can also destroy a "freeze." Therefore, a need exists for a method of creating a "freeze" effect using multiple cameras/lenses/shutters by synchronizing the shutters and eliminating shutter asynchronicity instead of "interlacing" the images.

SUMMARY OF THE INVENTION

The present invention discloses a method of creating a "freeze" by synchronizing the shutters of multiple cameras within a fraction of one one-thousandth of a second. In a preferred embodiment, 360 cameras—spaced at one (1) degree intervals—are arranged on a frame in a circle. However, other, non-circular arrangements may be used. The mechanism attaching each camera to the frame should allow the cameras to rotate up and down (tilt) and left to right (pan). Once the cameras are arranged in a circle, they must be leveled. To accomplish this, a laser leveling device, such as surveyors use, may be utilized. Next, each camera must be focused on the same exact spot. A sighting device is placed in the circle's center, where the ultimate subject will be photographed. This sighting device may be a ball, so that it may easily be sighted in the center of the circular sight of each camera lens.

Once the cameras are leveled and sighted, they must be fired simultaneously. Each camera, however, has its own CPU that processes the firing signal. Each CPU has a timing tolerance; that is, the time each CPU takes to process a firing signal will vary from camera to camera. These timing tolerance differences may be as wide as 300 to 500 milliseconds. The present invention eliminates these timing differences by bypassing each camera's CPU and connecting each camera's shutter control to a central computer controller. Thus, the controller sends one firing signal simultaneously to all 360 cameras.

Even if firing signals are sent simultaneously, the shutters may not perfectly synchronize if each camera's DC power supply voltage is not the same. Therefore, the present invention supplies each camera with DC power from a single source.

BRIEF DESCRIPTION OF THE DRAWINGS

For a more complete description of the present invention, and for further details and advantages thereof, reference is now made to the following Detailed Description taken in conjunction with the accompanying drawings, in which.

DETAILED DESCRIPTION OF THE DRAWINGS

Figure 1:
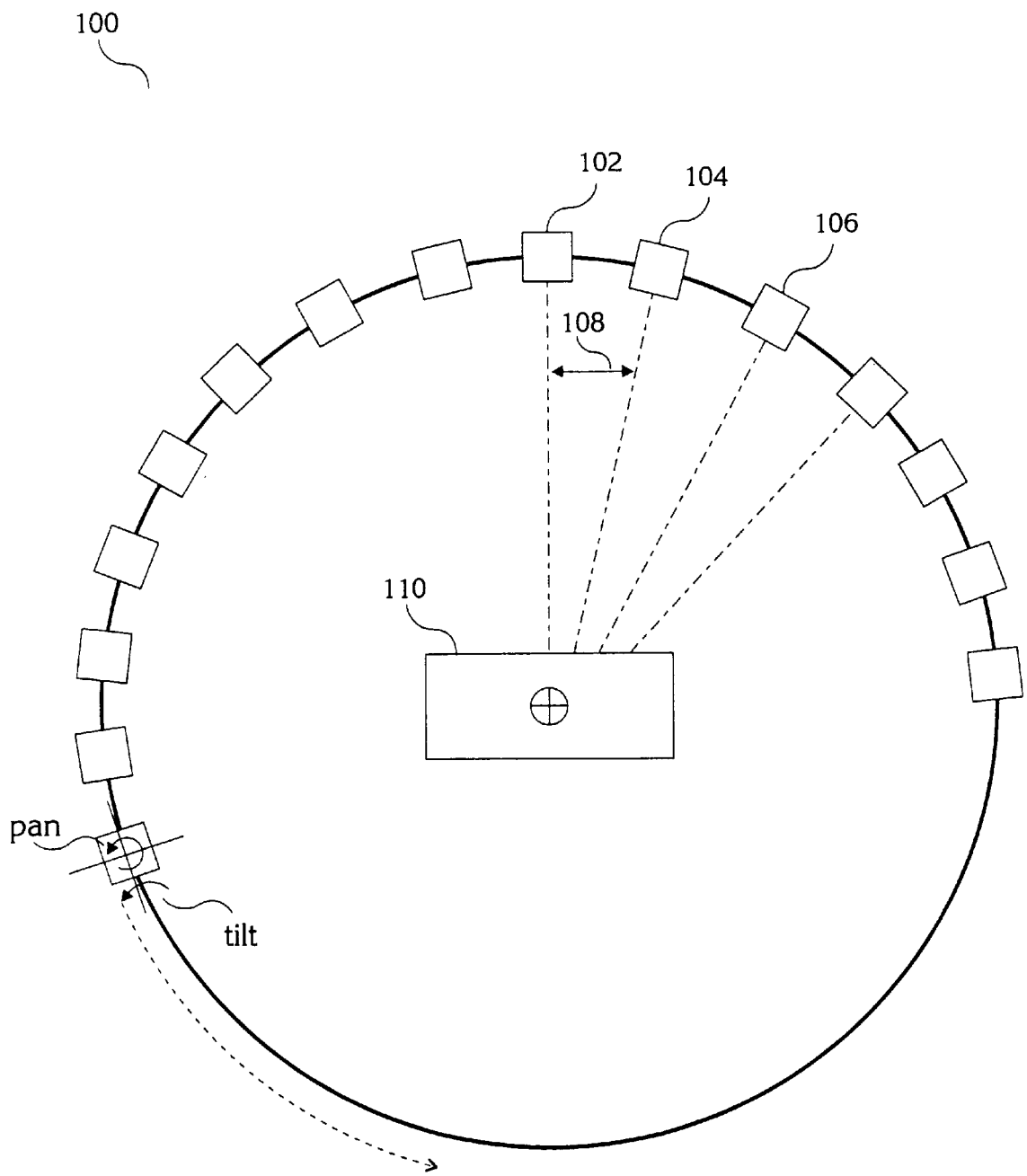
FIG. 1 is a not-to-scale schematic showing a circular camera arrangement.

The present invention comprises simultaneously photographing with multiple cameras a single, active subject. FIG. 1 illustrates a preferred arrangement 100. Three-hundred and sixty (360) cameras are arranged in a circle at one (1) degree intervals. For simplicity, this description will focus on only three cameras: 102, 104, and 106.

The cameras are first leveled using a leveling means, such as a laser device used by surveyors. Once the cameras are leveled, they are aimed (by adjusting tilt and pan) at a sighting device placed in the circle's center where subject 110 will eventually be photographed.

Figure 2:
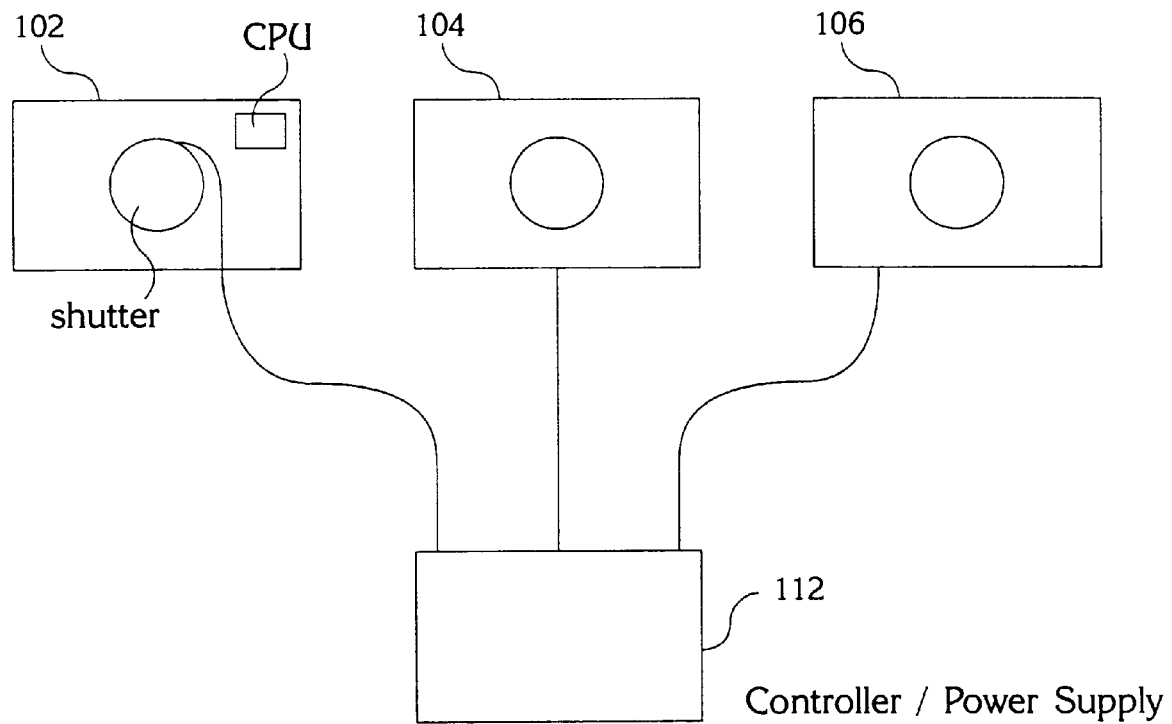
FIG. 2 illustrates a common controller/power supply controlling multiple cameras

Finally, after the cameras are arranged, leveled, and sighted, all the cameras simultaneously photograph subject 110. Computer controller/power supply 112 (illustrated in FIG. 2) bypasses each camera's CPU and sends the firing signal directly to each camera's shutter simultaneously. This common signal source greatly improves shutter synchronization by eliminating the various timing tolerance differences present when a separate CPU controls each camera. The common DC power supply 112 shown in FIG. 3 further improves shutter synchronization by eliminating timing differences arising from voltage differences among the cameras when each has its own power supply.

Figure 3:
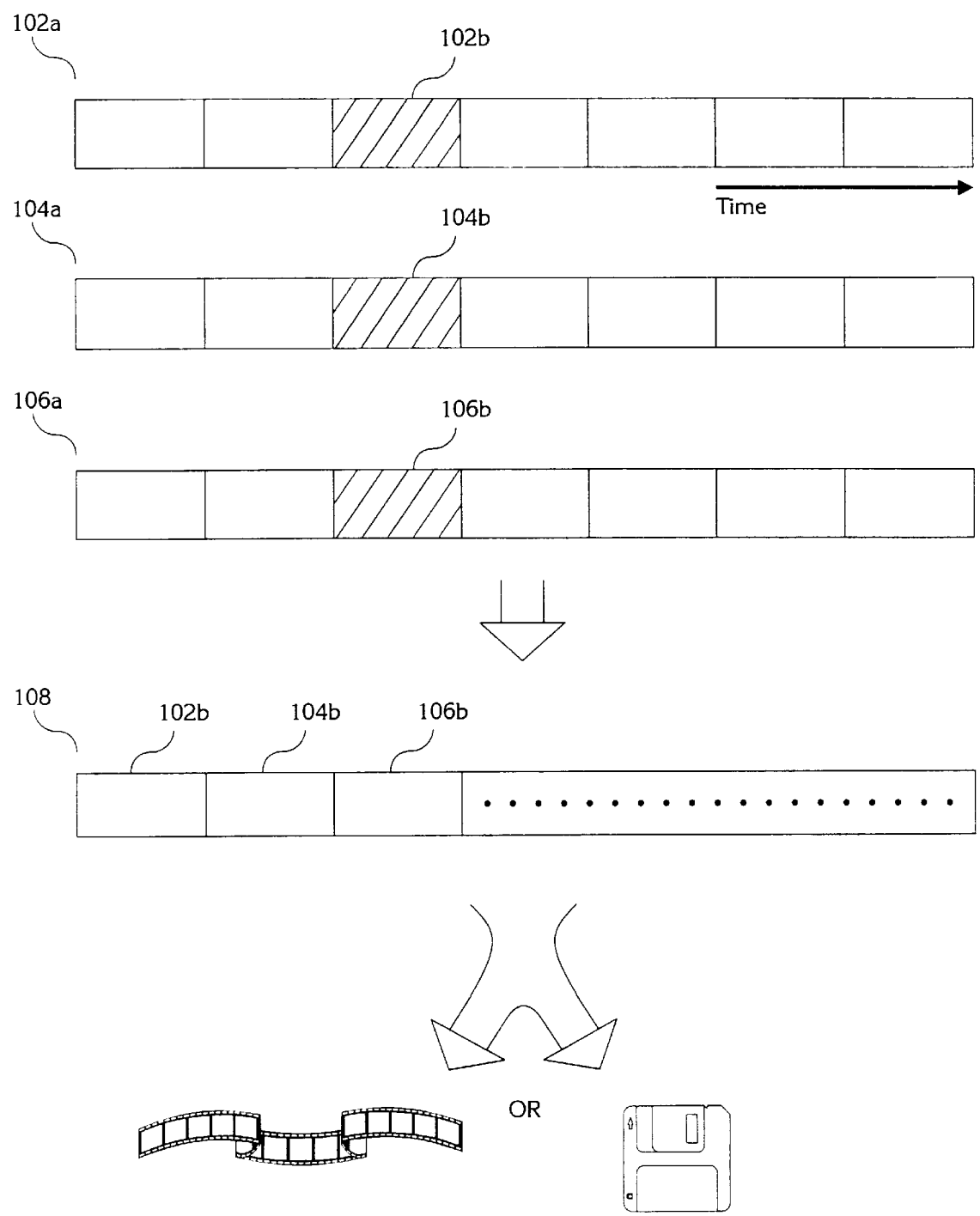
FIG. 3 is a schematic illustrating how simultaneously-shot photographs are sequenced to create a moving picture in accordance with the present invention.

FIG. 3 illustrates how individual frames are sequenced to effect the "freeze." Each camera 102, 106, and 106 contains its own, separate film roll 102a, 104a, and 106a. After the film is exposed, a frame 102b, 104b, and 106b from each film roll is chosen for the "freeze" sequence. Importantly, selected frames 102b, 104b, and 106b must be the same frame in terms of temporal order. For example, FIG. 3 shows the simultaneously-exposed third frame selected from each roll.

Next, the selected frames 102b, 104b, and 106b are sequenced to form a moving picture 108. This moving picture is the finished product, or "freeze," showing active subject 110 from a range of perspectives at a discrete instant.

The foregoing description has described the present method using a "camera." However, it should be noted that the present method may utilize any type of image recording medium, including: standard film/camera, CCD cameras, video cameras, and digital video recording devices. The common still camera exposing a roll of film is not the only alternative.

Although preferred embodiments of the invention have been described in the foregoing Detailed Description and illustrated in the accompanying drawings, it will be understood that the invention is not limited to the embodiments disclosed, but is capable of numerous rearrangements, modifications, and substitutions of parts and elements without departing from the spirit of the invention. Accordingly, the present invention is intended to encompass such rearrangements, modifications, and substitutions of parts and elements as fall within the spirit and scope of the invention.

I claim:

1. A method that uses a plurality of cameras having individually-controllable shutters to produce a freeze effect, comprising:
    generating a shutter firing signal using a central computer controller;
    providing said shutter firing signal to the shutter control of each of a plurality of cameras, each said camera has an individually-controllable shutter;
    capturing a first sequence of frames of an image on a first recording medium;
    capturing a second sequence of frames of the image on a second recording medium; and
    sequencing a first and second frame from the first and second sequences, wherein said first and second frames are from a near simultaneous time, to form a non-simultaneous moving picture.

2. The method of claim 1 wherein said recording medium is a film.

3. The method of claim 1 wherein said recording medium is an electromagnetic disk.

4. The method of claim 1 further comprises aligning said cameras on a sighting target.

5. The method of claim 4 wherein said aligning comprises adjusting tilt and pan.

6. An apparatus that uses a plurality of cameras having individually-controllable shutters to produce a freeze effect, comprising:
    a plurality of cameras wherein each individual camera of said plurality of cameras further comprises an individually-controllable shutter and a recording medium, each said individual camera captures a sequence of frames of an image on each said individual camera's said recording medium;
    a computer controller coupled to said plurality of cameras wherein said controller supplies a control signal to each said individually-controllable shutter within each individual camera, said control signal bypasses each said individual camera's control circuitry, said control signal allows said computer controller to directly control the shutter of each of said individual cameras to improve shutter synchronization between said individual cameras of said plurality of cameras; and
    a common power supply coupled to said plurality of cameras, wherein said common power supply supplies power to each of said individual cameras of said plurality of cameras.

7. The apparatus of claim 6 wherein each of said individual cameras of said plurality of cameras is aimed at a single subject.

8. The apparatus of claim 6 wherein each said individual camera comprises a traditional photographic camera.

9. The apparatus of claim 6 wherein each said individual camera comprises a CCD camera.

10. The apparatus of claim 6 wherein each said individual camera comprises a video camera.

11. The apparatus of claim 6 wherein each said individual camera comprises a digital video recording device.

12. An apparatus that uses a plurality of cameras having individually-controllable shutters to produce a freeze effect, comprising:
    a plurality of cameras wherein each individual camera of said plurality of cameras further comprises an individually-controllable shutter and a recording medium, each said individual camera captures a sequence of frames of an image on each said individual camera's said recording medium;

a computer controller coupled to said plurality of cameras wherein said controller supplies a control signal to each said individually-controllable shutter within each said individual camera, said control signal bypasses each said individual camera's control circuitry, said control signal allows said computer controller to directly control the shutter of each of said individual cameras to improve shutter synchronization between said individual cameras of said plurality of cameras; and a common power supply coupled to said plurality of cameras, wherein said common power supply supplies power to each of said individual cameras of said plurality of cameras.

13. The system of claim 12 wherein each camera is aimed at a single subject.

14. The system of claim 12 wherein said camera comprises a traditional photographic camera.

15. The system of claim 12 wherein said camera comprises a CCD camera.

16. The system of claim 12 wherein said camera comprises a video camera.

17. The system of claim 12 wherein said camera comprises a digital video recording device.

18. A method to produce an apparatus that uses a plurality of cameras having individually-controllable shutters to produce a freeze effect, comprising:

providing a plurality of cameras wherein each individual camera of said plurality of cameras further comprises an individually-controllable shutter and a recording medium, each said individual camera captures a sequence of frames of an image on each said individual camera's said recording medium;

coupling a computer controller to said plurality of cameras wherein said controller supplies a control signal to each said individually-controllable shutter within each said individual camera, said control signal bypasses each said individual camera's control circuitry, said control signal allows said computer controller to directly control the shutter of each of said individual cameras to improve shutter synchronization between said individual cameras of said plurality of cameras; and coupling a common power supply to said plurality of cameras, wherein said common power supply supplies power to each of said individual cameras of said plurality of cameras.

19. The method of claim 18 wherein each camera is aimed at a single subject.

20. The method of claim 18 wherein said camera comprises a traditional photographic camera.

21. The method of claim 18 wherein said camera comprises a CCD camera.

22. The method of claim 18 wherein said camera comprises a video camera.

23. The method of claim 18 wherein said camera comprises a digital video recording device.

24. A method that uses a plurality of cameras having individually-controllable shutters to produce a freeze effect, comprising:

providing a plurality of cameras wherein each individual camera of said plurality of cameras further comprises an individually-controllable shutter and a recording medium, each said individual camera captures a sequence of frames of an image on each said individual camera's said recording medium;

controlling said plurality of cameras with a computer controller coupled to said plurality of cameras wherein said controller supplies a control signal to each said individually-controllable shutter within each said individual camera, said control signal bypasses each said individual camera's control circuitry, said control signal allows said computer controller to directly control the shutter of each of said individual cameras to improve shutter synchronization between said individual cameras of said plurality of cameras; and powering said plurality of cameras with a common power supply coupled to said plurality of cameras.

25. The method of claim 24 wherein each of said individual cameras of said plurality of cameras is aimed at a single subject.

26. The method of claim 24 wherein each said individual camera comprises a traditional photographic camera.

27. The method of claim 24 wherein each said individual camera comprises a CCD camera.

28. The method of claim 24 wherein each said individual camera comprises a video camera.

29. The method of claim 24 wherein each said individual camera comprises a digital video recording device.

30. A programmable storage device readable by a machine, tangibly embodying a program of instructions executable by the machine to perform a method that uses a plurality of cameras having individually-controllable shutters to produce a freeze effect, comprising:

providing a plurality of cameras wherein each individual camera of said plurality of cameras further comprises an individually-controllable shutter and a recording medium, each said individual camera captures a sequence of frames of an image on each said individual camera's said recording medium;

controlling said plurality of cameras with a computer controller coupled to said plurality of cameras wherein said controller supplies a control signal to each said individually-controllable shutter within each said individual camera, said control signal bypasses each said individual camera's control circuitry, said control signal allows said computer controller to directly control the shutter of each of said individual cameras to improve shutter synchronization between said individual cameras of said plurality of cameras; and powering said plurality of cameras with a common power supply coupled to said plurality of cameras.

31. The programmable storage device of claim 30 wherein each of said individual cameras of said plurality of cameras is aimed at a single subject.

32. The programmable storage device of claim 30 wherein each said individual camera comprises a traditional photographic camera.

33. The programmable storage device of claim 30 wherein each said individual camera comprises a CCD camera.

34. The programmable storage device of claim 30 wherein each said individual camera comprises a video camera.

35. The programmable storage device of claim 30 wherein each said individual camera comprises a digital video recording device.

* * * * *